US012387211B2

(12) United States Patent
Ricardo et al.

(10) Patent No.: US 12,387,211 B2
(45) Date of Patent: Aug. 12, 2025

(54) SYSTEM AND METHOD USING RESOURCE PROVIDER APPLICATION ON MOBILE DEVICE AS AN ACCESS DEVICE

(71) Applicant: VISA INTERNATIONAL SERVICE ASSOCIATION, San Francisco, CA (US)

(72) Inventors: Salvador Ricardo, Miami, FL (US); Cristina Villarroel, Miami, FL (US); Ricardo Collada, Miami, FL (US); Jenny Ramirez, Miami, FL (US); Daniel Villar, Doral, FL (US); Manuel Alfredo Ferreiro Caballero, Miami, FL (US); Maikel Zuniga, West Palm Beach, FL (US); Liset Iturriaga Chavez, Miami, FL (US)

(73) Assignee: Visa International Service Association, San Francisco, CA (US)

( * ) Notice: Subject to any disclaimer, the term of this patent is extended or adjusted under 35 U.S.C. 154(b) by 139 days.

(21) Appl. No.: 18/478,313

(22) Filed: Sep. 29, 2023

(65) Prior Publication Data

US 2025/0111361 A1    Apr. 3, 2025

(51) Int. Cl.
*G06Q 20/40* (2012.01)
*G06Q 20/32* (2012.01)
*G06Q 20/38* (2012.01)

(52) U.S. Cl.
CPC ....... *G06Q 20/401* (2013.01); *G06Q 20/3278* (2013.01); *G06Q 20/38215* (2013.01); *G06Q 20/3829* (2013.01); *G06Q 2220/00* (2013.01)

(58) Field of Classification Search
CPC ............. G06Q 20/401; G06Q 20/3278; G06Q 20/38215; G06Q 20/3829; G06Q 2220/00
(Continued)

(56) References Cited

U.S. PATENT DOCUMENTS 11,562,348 B2    1/2023   Shrivastava et al.
2017/0221055 A1*  8/2017   Carlsson ................ G06Q 20/40
(Continued)

FOREIGN PATENT DOCUMENTS

EP    3605432 A1    2/2020
EP    3965042 A1    3/2022
WO    2012028309 A3   5/2012

OTHER PUBLICATIONS

Maggini "Deciding between native and cross-platform mobile fronted programming frameworks", IBM Developer, Published Jul. 2, 2019 with Internet Archive retrieval date of Aug. 5, 2020, 16 pages (Year: 2020).*

(Continued)

*Primary Examiner* — James D Nigh
(74) *Attorney, Agent, or Firm* — Kilpatrick Townsend & Stockton LLP

(57) ABSTRACT

Methods and systems for using a mobile device as a point-of-sale (POS) terminal provisioned by a resource provider are provided. A server computer can transmit, to a resource provider computer, a set of platform-specific scripts to be incorporated into a resource provider application provisioned on a user device. The server computer can register each instance of the resource provider application provisioned on any user device as an access terminal associated with the resource provider computer. The server computer can receive, directly from an instance of the resource provider application on a user device, a processing request message to perform a transaction. The server computer can obtain an authorization decision on behalf of the resource provider computer and transmit the authorization decision to the user device and the resource provider computer.

20 Claims, 10 Drawing Sheets

(58) Field of Classification Search
USPC .......................................................... 705/71
See application file for complete search history.

(56) References Cited

U.S. PATENT DOCUMENTS

| 2017/0270517 A1 | 9/2017 | Vasu et al. |
| 2018/0150816 A1* | 5/2018 | Liu ..................... G06Q 20/204 |
| 2019/0057389 A1 | 2/2019 | Carpenter et al. |
| 2020/0082395 A1 | 3/2020 | Collinge et al. |
| 2021/0073813 A1 | 3/2021 | Nolte et al. |

OTHER PUBLICATIONS

"Take Contactless Payments with Just Your iPhone", Square, Available online at: https://squareup.com/us/en/payments/tap-to-pay, Accessed from Internet on Sep. 20, 2023, pp. 1-7.

Application No. PCT/US2024/048727, International Search Report and Written Opinion, Mailed On Dec. 30, 2024, 12 pages.

* cited by examiner

SYSTEM AND METHOD USING RESOURCE PROVIDER APPLICATION ON MOBILE DEVICE AS AN ACCESS DEVICE

BACKGROUND

In transactions completed using a user device (e.g., a mobile device, or an electronic device), traditionally the user either stores credentials for payment (e.g., in each application associated with a resource provider or in a digital wallet) or inputs credentials for payment each time a transaction is conducted. When a user stores credentials for payment in each resource provider application, the user is vulnerable to data and identity theft, and is reliant on the cybersecurity of each individual resource provider to protect their credentials for payment. When a user manually inputs credentials for payment to complete each transaction, the user experience is less efficient and is prone to errors in inputting, for example, the account number, expiration date, and security code. Current methods for storing credentials for payment either in resource provider applications or in a digital wallet do not overcome the vulnerabilities associated with storing credentials for payment in several locations and with several resource providers.

Cardholders often carry their smart devices at all times. Accordingly, cardholders can benefit from means of using their smart devices to complete transactions directly with a payment processing service, thereby bypassing a resource provider system. However, conventional systems do not allow smart devices to be registered as point-of-sale (POS) terminals associated with resource providers.

Embodiments of the present application address these and other problems individually and collectively.

SUMMARY

One embodiment includes a method. The method includes: receiving, by a resource provider computer from a server computer, a set of platform-specific scripts to be incorporated into a resource provider application; provisioning, by the resource provider computer, a first instance of the resource provider application on a first user device, wherein each instance of the resource provider application provisioned on a user device includes the set of platform-specific scripts; receiving, by the first instance of the resource provider application on the first user device, a request to perform a first transaction; requesting, by the first instance of the resource provider application, first account credentials for a user of the first user device; receiving, by the first instance of the resource provider application using the set of platform-specific scripts, the first account credentials from a credential storing device via near field communication capability of the first user device; generating, by the first instance of the resource provider application using the set of platform-specific scripts, a transaction processing request message including transaction information and the first account credentials; and transmitting, by the first instance of the resource provider application using the set of platform-specific scripts, the transaction processing request message to the server computer for processing without storing the first account credentials on the first user device, wherein the server computer obtains an authorization decision associated with the transaction information of the first transaction using the first account credentials on behalf of the resource provider computer.

Another embodiment includes a server computer comprising: one or more processors; and a memory storing instructions that, when executed by the one or more processors, cause the one or more processors to perform a method comprising: transmitting, to a resource provider computer, a set of platform-specific scripts to be incorporated into a resource provider application, wherein each instance of the resource provider application provisioned on a user device includes the set of platform-specific scripts; registering each instance of the resource provider application provisioned on any user device as an access terminal associated with the resource provider computer; receiving, directly from a first instance of the resource provider application on a first user device, a processing request message to perform a transaction, the processing request message including a device certificate previously assigned to the first user device by the server computer; validating the first user device using the device certificate; upon validating the first user device, receiving, directly from the first instance of the resource provider application on the first user device, transaction information and account credentials, wherein the account credentials bypass the resource provider computer; obtaining an authorization decision in response to the processing request message using the account credentials on behalf of the resource provider computer; transmitting the authorization decision to the first instance of the resource provider application on the first user device; and transmitting the authorization decision to the resource provider computer.

Another embodiment includes a method. The method includes: transmitting, by a server computer to a resource provider computer, a set of platform-specific scripts to be incorporated into a resource provider application, wherein each instance of the resource provider application provisioned on a user device includes the set of platform-specific scripts; registering, by the server computer, each instance of the resource provider application provisioned on any user device as an access terminal associated with the resource provider computer; receiving, by the server computer directly from a first instance of the resource provider application on a first user device, a processing request message to perform a transaction, the processing request message including a device certificate previously assigned to the first user device by the server computer; validating, by the server computer, the first user device using the device certificate; upon validating the first user device, receiving, by the server computer directly from the first instance of the resource provider application on the first user device, a transaction information and account credentials, wherein the account credentials bypass the resource provider computer; obtaining, by the server computer, an authorization decision in response to the processing request message using the account credentials on behalf of the resource provider computer; transmitting, by the server computer, the authorization decision to the first instance of the resource provider application on the first user device; and transmitting, by the server computer, the authorization decision to the resource provider computer.

Further details regarding embodiments can be found in the Detailed Description and the Figures.

DETAILED DESCRIPTION

Figure 1:
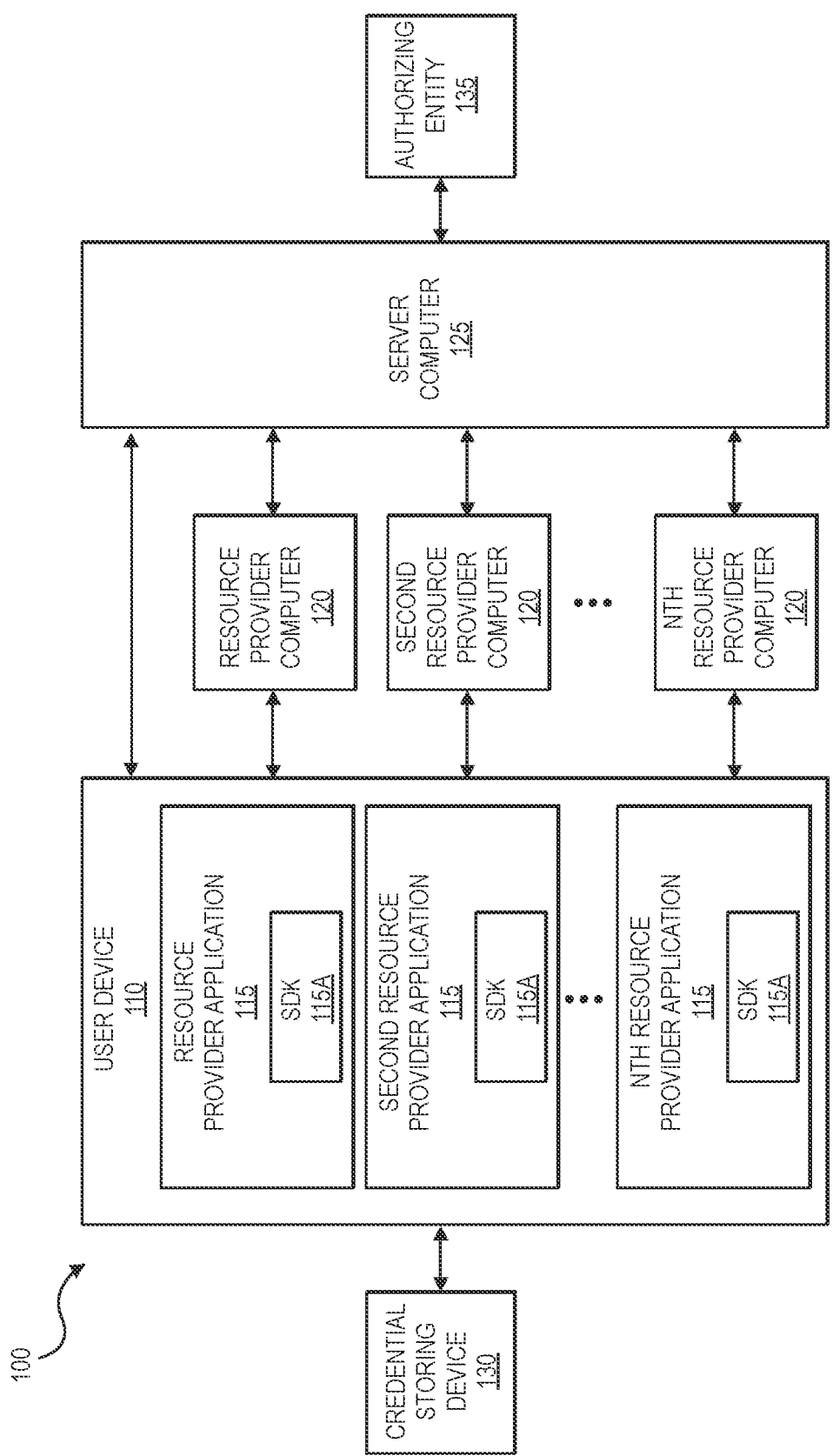
FIG. 1 shows a block diagram of a system according to various embodiments.

Embodiments include systems and methods for registering a resource provider application on a user device as an access device (e.g., a POS terminal) associated with a resource provider and completing a transaction via a server computer associated with a payment processor. According to various embodiments, the user device may store multiple resource provider applications for various resource providers, where each resource provider application on the user device acts as an access device (e.g., POS terminal) for corresponding resource provider. For instance, a user can register a user device (e.g., a mobile device) storing a resource provider application of a resource provider as a POS terminal associated with that resource provider. When a user initiates a transaction with the resource provider (e.g., via the resource provider application), the user can use a sensor (e.g., reader) of the user device to read a near-field communication (NFC) tag of a credential-storing device (e.g., a payment card). The user device can communicate with a server computer associated with a payment processor to complete the transaction.

For example, a user may download a ride sharing application on their user device. Typically, the user will either input account credentials (e.g., a PAN, expiration date, and CVV code) each time a transaction occurs or will save the account credentials within the ride sharing application. Disclosed embodiments reduce the vulnerability of the user's account credentials by eliminating the need for the account credentials to be manually input or for the account credentials to be stored within each application.

In an example of disclosed embodiments, the ride sharing application can include functionality (e.g., an SDK received from a payment processing entity) to enable the user's user device to act as a POS terminal of the ride sharing application provider. Thus, after downloading the ride sharing application to the user device, the user can request and complete a ride. Upon completion of the ride, instead of a stored payment method selection screen or a series of input fields for inputting account credentials, the user can be prompted to "tap" a payment card to the user device. According to various embodiments, if the payment information is requested at the beginning of the transaction (e.g., at the start of the ride in this example), the user can be the user can be prompted to "tap" a payment card to the user device then. The timing of when the account credentials are retrieved from the credential device can be modified according to the needs or requirements of the resource provider or the transaction type.

When the user "taps" the payment card to the device, the payment card, which can be equipped with an NFC tag, is brought within range for a sensor or NFC reader of the user device to receive account credential information from the NFC tag of the payment card. The account credentials are not shared with the backend of the ride sharing application. Rather, the SDK in the ride sharing application sandboxes the account credentials and creates a communication channel directly with the payment processor. The payment processor can then communicate with an issuer of the payment card to determine whether or not to authorize the transaction.

If the transaction is authorized, the payment processor can complete the transaction between the user and the ride sharing application provider and communicate with the ride sharing application to indicate that the transaction was successfully completed. Thus, the user can complete the transaction without storing sensitive information associated with the payment card in the ride sharing application itself or in a digital wallet.

Systems and methods described herein mitigate the risk of fraudulent transactions in resulting from bad actors accessing a user's payment credentials via a data leak or by hacking a resource provider's system. Additionally, systems and methods described herein improve the user experience for users who choose not to store payment credentials and rather input their credentials each time a transaction occurs. Accordingly, disclosed embodiments increase security by reducing the number of places a user's credentials for payment are stored, while improving the user experience for users who do not store their credentials for payment in a resource provider application.

As an illustrative example, a resource provider computer can receive a set of platform-specific scripts. These scripts can be incorporated into a resource provider application to, for example, enable a user device along with the resource provider application installed thereon to operate as a POS terminal associated with the resource provider. For example, the resource provider computer can provision an instance of the resource provider application on the user device, where each instance of the resource provider application includes the set of platform-specific scripts.

Subsequent to the provisioning, the user can initiate a transaction via the resource provider application. For example, the resource provider application can be an e-commerce platform through which the user initiates a purchase. In response to receiving the request to perform the transaction, the resource provider application can request account credentials for the user. As an example, the resource provider application can prompt, via a display of the user device, the user to provide account credentials by bringing a credential storing device (e.g., a payment card equipped with an NFC tag) near the user device such that a sensor of the user device can read credential information from the credential storing device.

In response to receiving the credentials from the credential storing device, the resource provider application can generate a transaction processing request message. The transaction processing request message can include transaction information and the credentials from the credential storing device. The resource provider application can transmit the transaction processing request message to the server computer, which, in turn, obtains an authorization decision associated with the transaction. The authorization can be, for example, obtained on behalf of the resource provider computer.

Embodiments described herein reference card-present transactions, in which the payment card is present. In some embodiments, systems and methods described herein can be used to complete card-not-present transactions even when the payment credentials are retrieved from the credential storing device (e.g., a payment card) of the user. Processing the transaction as a card present or as a card-not-present transaction may be determined by the transaction processing network (associated with the server computer described herein). For example, if the transaction is determined to be processed as a card-not-present transaction, the server computer may request further authentication information from the user such as a username/password combination, biometric information, a PIN, or other identifying information. This information can be used to authenticate the user and authorize the transaction.

Accordingly, rather than entering payment credentials manually through the resource provider application, or using payment credentials stored in the resource provider application, a user may seamlessly complete a transaction with a resource provider via the resource provider application. Prior to discussing specific embodiments, some terms may be described in detail.

A "user" may include an individual. In some examples, a user may be associated with one or more personal accounts and/or mobile devices. The user may also be referred to as a cardholder, account holder, or consumer in some embodiments.

A "user device" may be any suitable device that a user can interact with (e.g., a mobile device). User devices may be in any suitable form. Some examples of user devices include mobile devices, cellular phones, PDAs, personal computers (PCs), tablet computers, wearables, and the like. In some embodiments, where a user device is a mobile device, the mobile device may include a display, a memory, a processor, a computer-readable medium, and any other suitable component.

A "mobile device" (sometimes referred to as a mobile communication device) may include any suitable electronic device that may be transported and operated by a user, which may also provide remote communication capabilities to a network. A mobile communication device may communicate using a mobile phone (wireless) network, wireless data network (e.g., 3G, 4G, 5G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g., cellular phones), PDAs, tablet computers, net books, laptop computers, wearable devices (e.g., watches, rings, glasses), vehicles such as automobiles and motorcycles, personal music players, hand-held specialized readers, etc. A mobile device may include any suitable hardware and software for performing such functions, and may also include multiple devices or components (e.g., when a device has remote access to a network by tethering to another device—i.e., using the other device as a modem-both devices taken together may be considered a single mobile device).

"Account credentials" may include any suitable information associated with an account (e.g., a payment account and/or payment device associated with the account). Such information may be directly related to the account or may be derived from information related to the account. Examples of account credentials may include a PAN (primary account number or "account number"), user name, expiration date, and verification values such as CVV (card verification value), dCVV (dynamic card verification value), CVV2 (card verification value 2), CVC3 card verification values, a token, etc. An example of a PAN is a 16-digit number, such as "4000 1234 5678 9010." In some embodiments, account credentials can include additional information that may be used for authorizing a transaction. For example, account credentials can include a cryptogram associated with the transaction.

A "credential storing device" may include any suitable device that may provide account credentials to a resource provider. The credential storing device, i.e., payment device, may be a software object, a hardware object, or a physical object. As examples of physical objects, the credential storing device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A credential storing device may be associated with a value such as a monetary value, a discount, or store credit, and may be associated with an entity such as a bank, a resource provider, a payment processing network, or a person. A credential storing device may be used to make a payment transaction. Suitable credential storing devices can be hand-held and compact so that they can fit into a user's wallet and/or pocket (e.g., pocket-sized). Example credential storing devices may include smart cards, magnetic stripe cards, keychain devices (such as the Speedpass™ commercially available from Exxon-Mobil Corp.), etc. Other examples of credential storing devices include pagers, payment cards, security cards, access cards, smart media, transponders, and the like. If the credential storing device is in the form of a debit, credit, or smartcard, the credential storing device may also optionally have features such as magnetic stripes, RFID tags, and/or NFC tags. Such devices can operate in either a contact or contactless mode.

A "resource provider" may be an entity that can provide a resource such as goods, services, information, and/or access. Examples of resource providers includes merchants, data providers, transit agencies, governmental entities, venue and dwelling operators, etc. A "merchant" may typically be an entity that engages in transactions and can sell goods or services, or provide access to goods or services.

An "transaction processing request message" may be an electronic message that communicates or causes authorization or denial for a transaction. In some examples, a transaction processing request message is sent to a server computer to obtain an authorization decision on whether to authorize or decline the transaction. A transaction processing request message according to some embodiments may comply with ISO 8583, which is a standard for systems that exchange electronic transaction information associated with a payment made by a user using a payment device or payment account. The transaction processing request message may include an account identifier that may be associated with a credential storing device, payment device, or payment account. A transaction processing request message may also include additional data elements corresponding to "identification information" including, by way of example only: a service code, a CVV (card verification value), a dCVV (dynamic card verification value), a consumer device cardholder verification value, a PAN (primary account number or "account number"), a payment token, a username, an expiration date, etc. A transaction processing request message may also include "transaction information," such as any information associated with a current transaction, such as the transaction amount, resource provider identifier, resource provider location, acquirer bank identification number (BIN), card acceptor ID, information identifying items being purchased, etc., as well as any other information that may be utilized in determining whether to identify and/or authorize a transaction.

The term "identification information" may include any data or information associated with a user or device. Examples of identification data may include a name of a user associated with the device, an organization associated with the device, payment information such as a primary account number (PAN) associated with the device, an expiration date of the device, a certificate associated with the device, an IMEI or serial number of the device, etc.

A "server computer" may include a powerful computer or cluster of computers associated with a payment processor or other financial entity. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

A "resource provider computer" can include a computer, server, or series of interconnected computers maintained by or associated with a resource provider. A resource provider can include an entity (e.g., a merchant, retailer) providing resources (e.g., goods/services) to a user. The resource provider computer can provide a webpage/portal allowing for users to request/order goods or services. The information provided by the user requesting the goods/services can be referred to as "interaction data." The interaction data can include information relating to the requested goods/services (e.g., item numbers, a total value for the goods/services), user details (e.g., username, age, address), user device details, etc.

FIG. 1 shows a system 100 comprising a number of components. The system 100 comprises a user device 110 and a credential storing device 130, both associated with and operated by a user. The system 100 further comprises a resource provider computer 120, a server computer 125, and an authorizing entity 135 each of which may be embodied by one or more computers.

The user device 110 may be capable of interacting with the resource provider computer 120 and the server computer 125. The resource provider computer 120 can also be capable of interacting with the server computer 125. The user device 110, resource provider computer 120, and the server computer 125 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, servers, and devices may be transmitted using a secure communications protocols such as, but not limited to, Secure File Transfer Protocol (SFTP); Secure Hypertext Transfer Protocol (HTTPS), Secure Socket Layer (SSL), ISO (e.g., ISO 8583) and/or the like.

An example of the user device 110 is a mobile device such as a smart phone, smart watch, wearable device, etc. capable of executing one or more applications stored thereon. For example, the user device 110 may be configured to execute a resource provider application 115. The resource provider application 115 may be an application associated with a resource provider and installed on the user device 110 thereby enabling a user to access an interactive computing environment associated with the resource provider. For example, the resource provider application 115 can be a platform-specific application that allows the user to conduct transactions with the resource provider.

The credential storing device 130 can be a payment device, such as a payment card configured to store and/or transmit account credentials. The credential storing device 130 can be equipped with circuitry or devices such as an RFID tag or NFC tag that enable the credential storing device 130 to transmit account credentials to a sensor when in proximity to the sensor. As an example, the user device 110 can include an NFC sensor (e.g., an NFC reader) capable of receiving or retrieving account credentials from the credential storing device 130 when the credential storing device 130 is brought within range of the user device 110.

The resource provider computer 120 may be associated with a resource provider, which may be an entity that can provide a resource such as goods, services, information, and/or access. Examples of a resource provider include merchants, access devices, secure data access points, etc. A merchant may typically be an entity that engages in transactions and can sell goods or services, or provide access to goods or services. The resource provider may accept multiple forms of payment (e.g., a payment card such as a credit or debit card) and may use multiple tools to conduct different types of transactions.

The server computer 125 may be associated with a payment processor, which may be an entity that enables payment processing between a resource provider and a user. The server computer 125 can provide, to the resource provider computer 120 a set of platform-specific scripts to be incorporated into the resource provider application 115. The platform-specific scripts can be, for example, a software development kit (SDK) 115A containing a set of software tools. As an example, the set of platform-specific scripts may be included in an instance of the resource provider application 115 provisioned on the user device 110. The platform-specific scripts can enable the resource provider application 115 to perform one or more operations described herein for facilitating a transaction between the user and the resource provider via the server computer 125.

One or more components of the system 100 can be used to complete a transaction according to disclosed embodiments. For example, the user can complete the transaction without interacting with the resource provider computer 120 by enabling the user device 110 and the resource provider application 115 installed thereon to function as a POS terminal associated with the resource provider.

In an example, the resource provider computer 120 operated by a resource provider can receive a set of platform-specific scripts to be incorporated into the resource provider application 115 from the server computer 125. The resource provider computer 120 can provision an instance of the resource provider application 115 on the user device 110. For example, the user can download the instance of the resource provider application 115 to the user device 110. The set of platform-specific scripts can enable the user device 110, via the resource provider application 115, to act as a POS terminal enabling the user to complete a transaction with the resource provider. In some embodiments, each instance of the resource provider application 115 provisioned on a user device (e.g., user device 110) can be registered with the server computer 125 as an access terminal (e.g., a POS terminal) associated with the resource provider computer 120.

When a user downloads and installs the resource provider application 115 to the user device 110, the server computer 125 can assign or store an identifier of the device and an identifier of the resource provider managing the resource provider application 115. A device identifier can be, for example, a user device ID such as an IMEI number that can be used to identify the user device 110 as a registered access terminal with the resource provider. Similarly, each resource provider can be associated with a merchant ID, such that each registered user device 110 can also be associated with the particular resource provider.

The user device 110 can store any number of resource provider applications 115, each associated with a different resource provider computer 120 and resource provider. For example, the user device can store N resource provider applications 115. The resource provider applications 115 can be associated with various resource providers providing a variety of goods and services. Example resource provider applications 115 can include ridesharing applications, e-commerce applications, or any other application through which a user can conduct a transaction.

When the user device 110 stores N resource provider applications 115, the server computer 125 can register the user device 110, for example, by storing the device ID, with each resource provider of the N resource providers for which the user device can act as an access terminal. In other words, the server computer 125 can associate the user device 110 with the merchant ID of each resource provider for which the user device 110 can act as an access terminal.

After installing the instance of the resource provider application 115 on the user device 110, the user can initiate a transaction. For example, the user can initiate a purchase with the resource provider via the resource provider application 115. The resource provider application 115 can receive the request to perform the transaction and request account credentials for the user of the user device 110. As an example, the resource provider application 115 can cause a display of the user device 110 to display an interface instructing the user to place the credential storing device 130 near the user device 110. When the credential storing device 130 is within a certain range of the user device 110, a sensor of the user device 110 can receive account credentials from the credential storing device 130.

When the account credentials are received by the resource provider application 115, the resource provider application 115 can generate a transaction processing request message that includes transaction information associated with the initiated transaction and the received account credentials. The resource provider application 115 can transmit the transaction processing request message to the server computer 125. The server computer 125 can obtain an authorization decision (e.g., from the authorizing entity 135) associated with the transaction information using the received account credentials on behalf of the resource provider computer 120. Subsequently, the server computer 125 can transmit the authorization decision to the resource provider application 115 and/or the resource provider computer 120.

In one embodiment, the processing request message can include a device certificate. For example, the device certificate may be assigned to the user device 110 when the user device 110 is registered as an access terminal with the server computer 125. In response to receiving the processing request message, the server computer 125 can validate the user device 110 using the received device certificate prior to receiving the transaction information and account credentials. The device certificate can include or be generated using, for example, the device ID associated with the user device 110 that was registered by the server computer 125 and the merchant ID associated with the resource provider. Accordingly, the merchant ID can indicate which resource provider of the N resource providers that the user is transacting with.

Obtaining the authorization decision can involve the server computer 125 communicating with an authorizing entity 135. The authorizing entity 135 can be, for example, an issuer of the credential storing device 130. The authorizing entity 135 can receive the account credentials and the transaction information from the server computer 125 and make a determination that the transaction can be either authorized or denied.

Accordingly, the components of system 100 can interact to enable the user device 110 and the resource provider application 115 installed thereon to function as an access terminal of the resource provider computer 120. This enables the user to complete transactions with the resource provider while bypassing the resource provider computer 120. Disclosed embodiments facilitate transactions without requiring the user to store account credentials with every application associated with a unique resource provider, or linking the application(s) with the user's digital wallet. In some embodiments, the user does not need to store any account credentials on the user device. Additional security is provided by "tapping" the credential storing device 130 to provide account credentials to the resource provider application 115 as the account credentials are not transmitted from the credential storing device 130 via a public or unsecured network.

Figure 2:
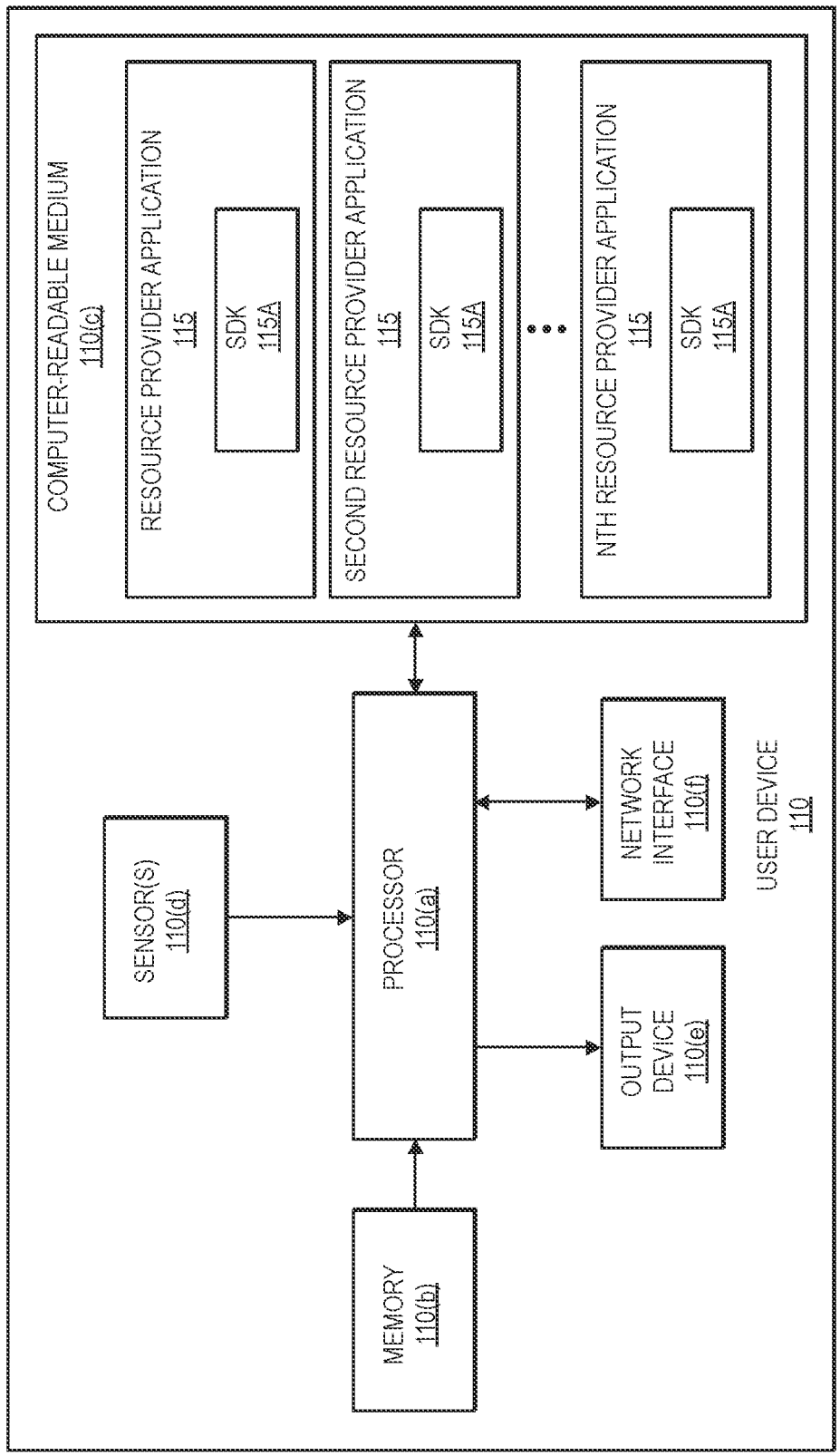
FIG. 2 shows a block diagram of an exemplary user device according to various embodiments.

An example of the user device 110, according to some embodiments, is shown in FIG. 2. The user device 110 may include a processor 110(a) operatively coupled to a computer readable medium 110(c) (e.g., one or more memory chips, etc.), input elements 110(b) such as buttons or the like, one or more sensors 110(d) (e.g., a contact chip reader, a contactless reader, a magnetic stripe reader, etc.), an output device 110(e) (e.g., a display, a speaker, etc.) and a network interface 110(f). A housing may house one or more of these components.

The computer readable medium 110(c) may include instructions or code, executable by a processor, e.g., processor 110(a). The instructions may include instructions for communicating with a server computer, e.g., the server computer 125 to complete transactions between a user and a resource provider, and instructions for any other suitable function as described herein.

The computer readable medium 110(c) can include a series of instructions that, when executed, cause the processor 110(a) to communicate with the server computer 125 to communicate transaction information and account credentials to the server computer 125, bypassing the resource provider computer 120. The computer readable medium 110(c) of the user device 110 can include N resource provider applications 115, where N is greater than or equal to one. When a user interacts with a resource provider application 115, the resource provider application may receive a transaction request associated with a transaction the user wishes to make with the resource provider managing the specific resource provider application 115, prompt the user to provide account credentials using the credential storing device 130, and generate a transaction processing request message containing transaction information and the account credentials for transmittal to the server computer 125. The account credentials can be received at the user device 110 from the credential storing device 130 via one or more sensors 110(d) of the user device 110.

As previously described, each of the N resource provider applications 115 can include an SDK 115A. The SDK 115A can be received by each resource provider computer and incorporated into an application (e.g., the resource provider application 115) managed by each unique resource provider. For example, the server computer 125 can provide a set of platform-specific scripts (e.g., those included in the SDK 115A) to each resource provider. Each resource provider can then incorporate the SDK 115A into an application that can be provisioned on the user device 110. The SDK 115A enables the user device 110 to communicate with the server computer 125 securely to complete one or more transactions between the user and a resource provider, thereby enabling the user device 110 to act as an access terminal associated with a particular resource provider.

As a brief example, the $N^{th}$ resource provider computer can receive an SDK 115A from the server computer 125. The $N^{th}$ resource provider can incorporate the SDK 115A into the $N^{th}$ resource provider application, thereby enabling a user device on which the application is installed to act as an access terminal associated with the $N^{th}$ resource provider. When the $N^{th}$ resource provider application is installed on the user device 110, the server computer 125 can record a device ID associated with the user device 110 and a merchant ID associated with the $N^{th}$ resource provider. Thus, when the user initiates a transaction with the $N^{th}$ resource provider, the transaction can proceed with the user device 110, enabled by the SDK 115A, acting as an access terminal of the $N^{th}$ resource provider.

Referring back to FIG. 1, the server computer 125 may include data processing subsystems, networks, and operations used to support and deliver authorization services, exception file services, and clearing and settlement services. For example, the server computer 125 may include a server coupled to a network interface (e.g., by an external communication interface), and databases of information. The server computer 125 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The server computer 125 may use any suitable wired or wireless network, including the Internet.

Figure 3:
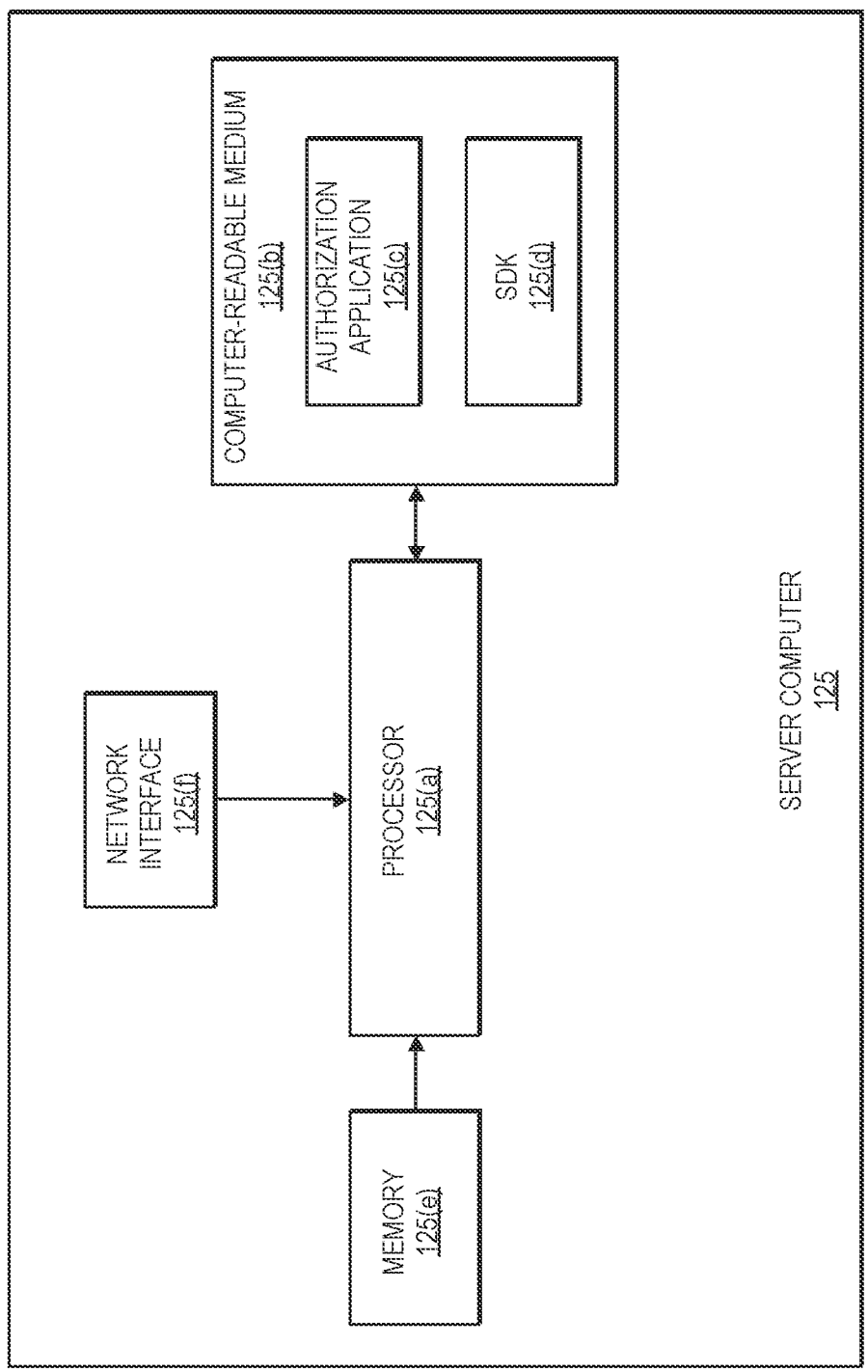
FIG. 3 shows a block diagram of an exemplary server computer according to various embodiments.

An example of the server computer 125 is illustrated in FIG. 3. The server computer 125 may include a processor 125(a) operatively coupled to a computer readable medium 125(b) (e.g., one or more memory chips, etc.), memory 125(e), and a network interface 125(f).

The computer readable medium 125(b) may include instructions or code, executable by a processor, e.g., processor 125(a). The instructions may include instructions for communicating with the user device 110, and/or resource provider computer 120 to complete transactions between the user and a resource provider, and instructions for any other suitable function as described herein. For example, the computer readable medium 125(b) may store an authentication application 125(c) configured to communicate, via a network, with the user device 110 to receive transaction information and account credentials and to obtain an authorization decision indicating whether to deny or authorize a transaction.

The computer readable medium 125(b) can also include an SDK 125(d). The SDK 125(d) can include the set of platform-specific scripts and can be transmitted to the resource provider computer 120. Subsequently, the resource provider computer 120 can include the set of platform-specific scripts in an instance (e.g., a version) of the resource provider application 115. The set of platform-specific scripts included in the SDK 125(d) can enable the interaction between the user device 110 and the server computer 125 to complete a transaction between a user and a resource provider. For example, the resource provider application instance using the set of platform-specific scripts can generate a transaction processing request message for transmittal to the server computer 125 to cause the server computer 125, via authorization application 125(c), to obtain an authorization decision from the authorizing entity 135.

The memory 125(e) can be a database, or other memory, physical storage device, or cloud-based storage device. The memory 125(e) can, for example, store enrollment information associated with user devices registered as access terminals with particular resource providers. Enrollment information can enable the server computer 125 to validate a user device, e.g., using a device certificate included in the transaction processing request message, prior to receiving the transaction information and account credentials from the resource provider application 115.

The computer readable medium 125(b) can also include instructions stored thereon that, when executed by the processor 125(a), cause the server computer 125 to perform a method including: transmitting, to a resource provider computer, a set of platform-specific scripts to be incorporated into a resource provider application, wherein each instance of the resource provider application provisioned on a user device includes the set of platform-specific scripts; registering each instance of the resource provider application provisioned on any user device as an access terminal associated with the resource provider computer; receiving, directly from a first instance of the resource provider application on a first user device, a processing request message to perform a transaction, the processing request message including a device certificate previously assigned to the first user device by the server computer; validating the first user device using the device certificate; upon validating the first user device, receiving, directly from the first instance of the resource provider application on the first user device, transaction information and account credentials, wherein the account credentials bypass the resource provider computer; obtaining an authorization decision in response to the processing request message using the account credentials on behalf of the resource provider computer; transmitting the authorization decision to the first instance of the resource provider application on the first user device; and transmitting the authorization decision to the resource provider computer.

Figure 4:
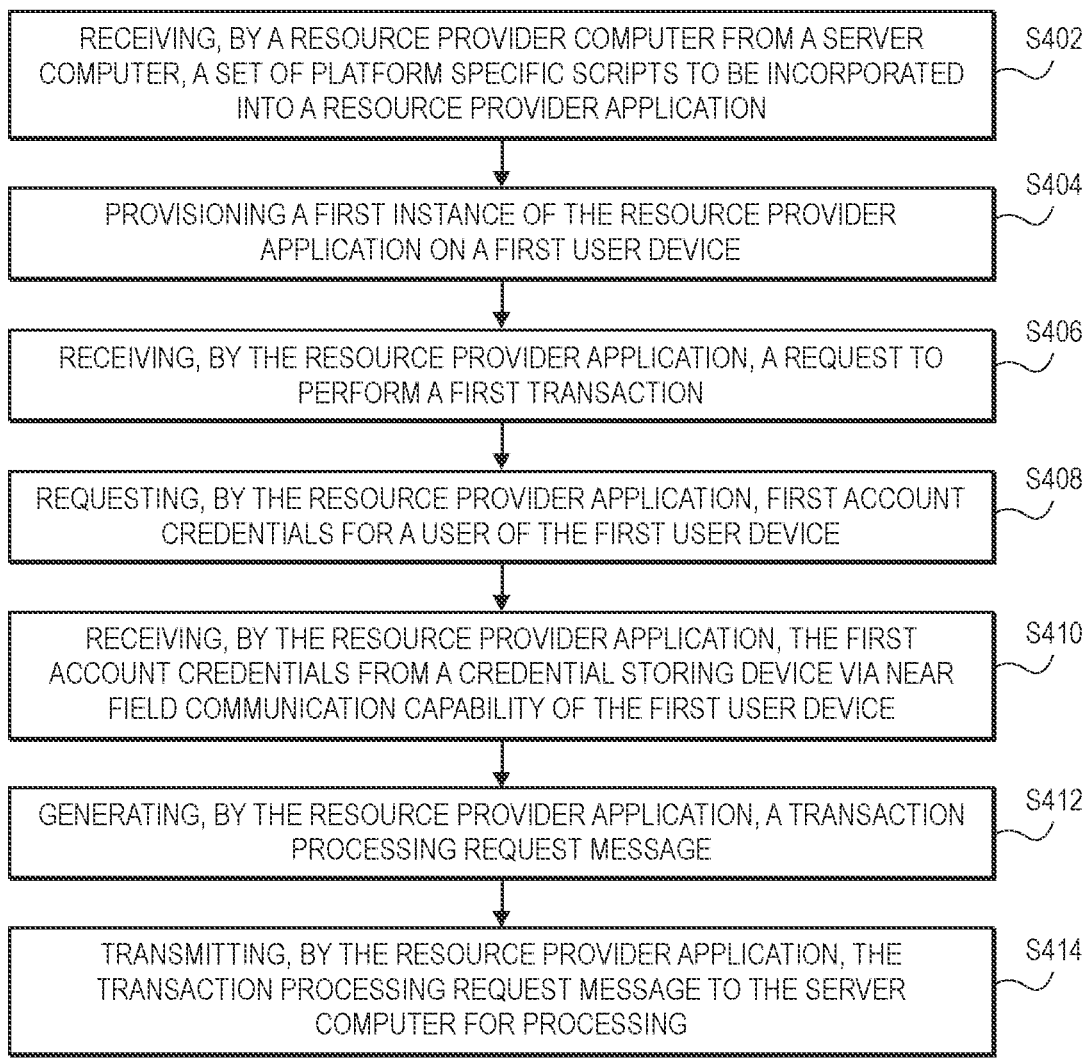
FIG. 4 shows a flow diagram illustrating a method according to various embodiments.

A method 400 according to examples of the present application can be described with respect to FIG. 4.

The method 400 enables a user to complete a transaction with a resource provider using a user device 110 storing a resource provider application 115 acting as an access terminal of a resource provider computer 120. In a specific example, the method 400 may be used to authorize a transaction through communication between the user device 110 and the server computer 125, bypassing the resource provider computer 120.

At step S402, the method 400 can include receiving, by a resource provider computer 120 from a server computer 125, a set of platform-specific scripts to be incorporated into a resource provider application 115. For example, the server computer 125 can transmit the set of platform-specific scripts to the resource provider computer 120 as an SDK (e.g., SDK 125(d)). The set of platform-specific scripts can include executable code for performing one or more steps described with respect to method 400 for completing a transaction (e.g., a card-present transaction) with a user device 110. The set of platform-specific scripts can be unique to a mobile device platform or operating system, such as Android™ or iOS™ and can be integrated into mobile applications managed by resource providers.

As an example, a payment processor managing the server computer 125 can develop an SDK (e.g., SDK 125(d)), which can include one or more tools to enable the user device 110 storing a resource provider application 115 to be registered as an access terminal for the resource provider computer 120. The SDK 125(d) can be made available to or otherwise provided to a number of resource providers such that each resource provider can develop a resource provider application including the set of platform-specific scripts (or tools) of the SDK 125(d). Thus, each resource provider can develop a resource provider application with capability to enable the user device 110 on which the resource provider application is installed to complete a card-present transaction by communicating with the server computer 125. The server computer 125 can manage execution of the platform-specific scripts as part of the first instance of the resource provider application 115 on the first user device 110. This management can include maintaining a direct communication channel with the resource provider application 115 on the first user device 110.

At step S404, the method 400 can include provisioning, by the resource provider computer 120, a first instance of the resource provider application 115 on a first user device 110, wherein each instance of the resource provider application 115 provisioned on a user device 110 includes the set of platform-specific scripts. As an example, the set of platform-specific scripts can be included in one or more versions of the resource provider application 115 that are available for the user to download to the user device 110.

In some embodiments, at step S404, the method 400 can include receiving, by the resource provider computer 120 from the first user device 110, a request to provision the first instance of the resource provider application 115 on the first user device 110. The request can include, for example, a device identifier of the first user device 110. The device identifier can be a model number, a serial number, a device type, an IP address, or any other information capable of identifying the user device 110. The method 400 can also include registering, by the resource provider computer 120 with the server computer 125, the first user device 110 as a transaction terminal associated with the resource provider computer 120. Thus, all user devices provisioned with an instance of the resource provider application are registered as transaction terminals associated with the resource provider computer 120.

In some embodiments, the server computer 125 can assign a unique identifier to the resource provider computer 120 such that each instance of the resource provider application 115 provisioned on a user device includes the unique identifier. In various embodiments, the server computer 125 can transmit a certificate key to the first instance of the resource provider application 115 upon provisioning the first instance of the resource provider application 115 on the first user device 110. The certificate key can be specific to the first user device 110. Thus, each user device upon which the resource provider application is provisioned can be assigned a unique identifier or certificate key. In some embodiments, the first instance of the resource provider application 115 can transmit the certificate key to the server computer 125 at pre-determined time intervals to refresh and/or maintain registration with the server computer 125.

At step S406, the method 400 can include receiving, by the first instance of the resource provider application 115 on the first user device, a request to perform a first transaction. The request to perform a first transaction can be generated in response to the user interacting with the resource provider application 115 through an interface and/or input devices of the user device 110. The user can, for example, initiate a purchase of goods or services from the resource provider, causing the resource provider application 115 to initiate performance of the requested purchase transaction.

At step S408, the method 400 can include requesting, by the first instance of the resource provider application 115, first account credentials for a user of the first user device 110. For example, via the first instance of the resource provider application 115, the user device 110 can display or otherwise provide a prompt to the user. The prompt can instruct the user to, for example, bring a credential storing device 130 near the user device 110 or to "tap" the credential storing device 130 on a particular location of the user device 110 (e.g., the location of a sensor). In some embodiments, a user interface is pushed to the first instance of the resource provider application 115 to be displayed on the first user device 110 by the server computer 125. The user interface can ask that the user bring the credential storing device 130 within the near field communication capability of the first user device 110. In some embodiments, for enhanced security, the transaction may time out if the credential storing device 130 is not read by the user device within a predetermined period of time.

At step S410, the method 400 can include receiving, by the first instance of the resource provider application 115 using the set of platform-specific scripts, the first account credentials from a credential storing device 130 via near field communication capability of the first user device 110. As an example, the user can bring the credential storing device 130 near the user device 110 such that a sensor of the user device 110 can read or receive, via near field communication methods, information from the credential storing device 130, which can include an RFID tag, NFC tag, or other circuitry or device through which information can be transmitted to the user device 110. The resource provider application 115 can be enabled to receive the account information, for example, by one or more of the set of platform-specific scripts.

In some embodiments, the first instance of the resource provider application 115 can acquire the first account credentials for each new transaction performed using the first instance of the resource provider application 115. Thus, the user does not have to either store the first account credentials on the user device 110 or in the resource provider application 115, which increases the vulnerability of having the first account credentials accessed by a bad actor. This also obviates the need for a user who does not store their account credentials to manually input the account credentials each time a transaction is performed, thereby improving the user experience.

In some embodiments, the initiated transaction can be processed as a card-not-present transaction. In a card-not-present transaction, the user can be prompted by the resource provider application 115 to input or otherwise provide authenticating information such as a username/password combination, biometric information, a PIN, or other identifying information. This information can be used to authenticate the user and/or to locate an account of the user to be used to process the transaction as a card-not-present transaction.

At step S412, the method 400 can include generating, by the first instance of the resource provider application 115 using the set of platform-specific scripts, a transaction processing request message including transaction information and the first account credentials. As discussed above, the first instance of the resource provider application 115 can include a unique identifier. The transaction processing request message can further include the unique identifier such that the server computer 125 can associate the request with the particular resource provider. In another example, the transaction processing request message can also include a device identifier of the user device. This device identifier can be provided, for example, in a data field reserved for a resource provider terminal identifier. Because the user device along with the resource provider application stored thereon is acting as the access terminal, the device identifier can be provided as the resource provider terminal identifier. The transaction processing request message can also include a unique identifier assigned to the resource provider computer 120 by the server computer 125. The unique identifier can be used to facilitate the transaction and to identify the resource provider with which the transaction is to be completed.

At step S414, the method 400 can include transmitting, by the first instance of the resource provider application 115 using the set of platform-specific scripts, the transaction processing request message to the server computer 125 for processing without storing the first account credentials on the first user device 110. The server computer 125 can obtain an authorization decision associated with the transaction information of the first transaction using the first account credentials on behalf of the resource provider computer 120.

In some embodiments, the transaction processing request message can include a device certificate, certificate key, or unique identifier previously assigned to the first user device 110 by the server computer 125. For example, the device certificate, certificate key, or unique identifier may have been assigned during the process of registering the first user device 110 as a transaction terminal. Thus, the server computer 125 can identify the first instance of the resource provider application 115 as one of a plurality of access terminals associated with the resource provider computer 120 based on the device certificate. The server computer 125 can validate the first user device 110 using the device certificate such that, upon validation, the server computer 125 can receive, directly from the first instance of the resource provider application 115 on the first user device 110, the transaction information and the account credentials.

In a card-not-present transaction, the processing request message can include account credentials or other information retrieved from the credential storing device, as well as authenticating information provided by the user (e.g., a username/password combination, biometric information, a PIN, or other identifying information).

In some embodiments, the transaction processing request message and/or the first account credentials can bypass the resource provider computer 120. For example, the first user device 110 can communicate, via the resource provider application, with the server computer 125 to complete the requested transaction, without exposing the user's credential information to another system (e.g., the resource provider computer 120). In another example, the credential-reading capability is sandboxed within the SDK 125(*d*) (e.g., the set of platform-specific scripts), such that the transaction occurs directly through the server computer 125, bypassing the resource provider computer 120.

At step S414, obtaining an authorization decision can include: decrypting, in a cloud processing environment, the account credentials; generating a transaction request message including an indication of presentment of a credential storing device 130 during the transaction; and transmitting the transaction request message to an authorizing entity. The authorizing entity can be associated with the entity providing the server computer 125 or may be associated with a separate entity providing authorization services. In another example, the authorization entity can be a component or sub-component of the server computer 125. The authorizing entity can authorize or decline the transaction based on at least the account credentials being retrieved by the first instance of the resource provider application 115 from the credential storing device 130.

Upon completion of the transaction, the resource provider computer 120 can receive a notification of the transaction, such as a receipt or other message indicating the completion of the transaction and providing transaction information. For example, the server computer 125 can obtain the authorization decision and transmit the authorization decision to the first instance of the resource provider application 115 on the first user device 110 and/or the resource provider computer 120.

In another embodiment, the resource provider application 115 can be provisioned on multiple different user devices, such that each user device on which the resource provider application is installed can act as an access terminal. For example, the resource provider computer 120 can provision a second instance of the resource provider application on a second user device. The second instance of the resource provider application can also include the set of platform-specific scripts. The second instance of the resource provider application can request second account credentials for the user of the second user device. The second instance of the resource provider application on the second user device can receive a request to perform a second transaction. The second instance of the resource provider application can receive, using the set of platform-specific scripts, the second account credentials from the second credential storing device via near field communication capability of the second user device. The second instance of the resource provider application can generate, using the set of platform-specific scripts, a second transaction processing request message including transaction information associated with the second transaction and the second account credentials. The second instance of the resource provider application can then transmit, using the set of platform-specific scripts, the second transaction processing request message to the server computer 125 for processing without storing the second account credentials on the second user device. The server computer 125 then obtains a second authorization decision for the second transaction using the second account credentials on behalf of the resource provider computer 120.

Figure 5:
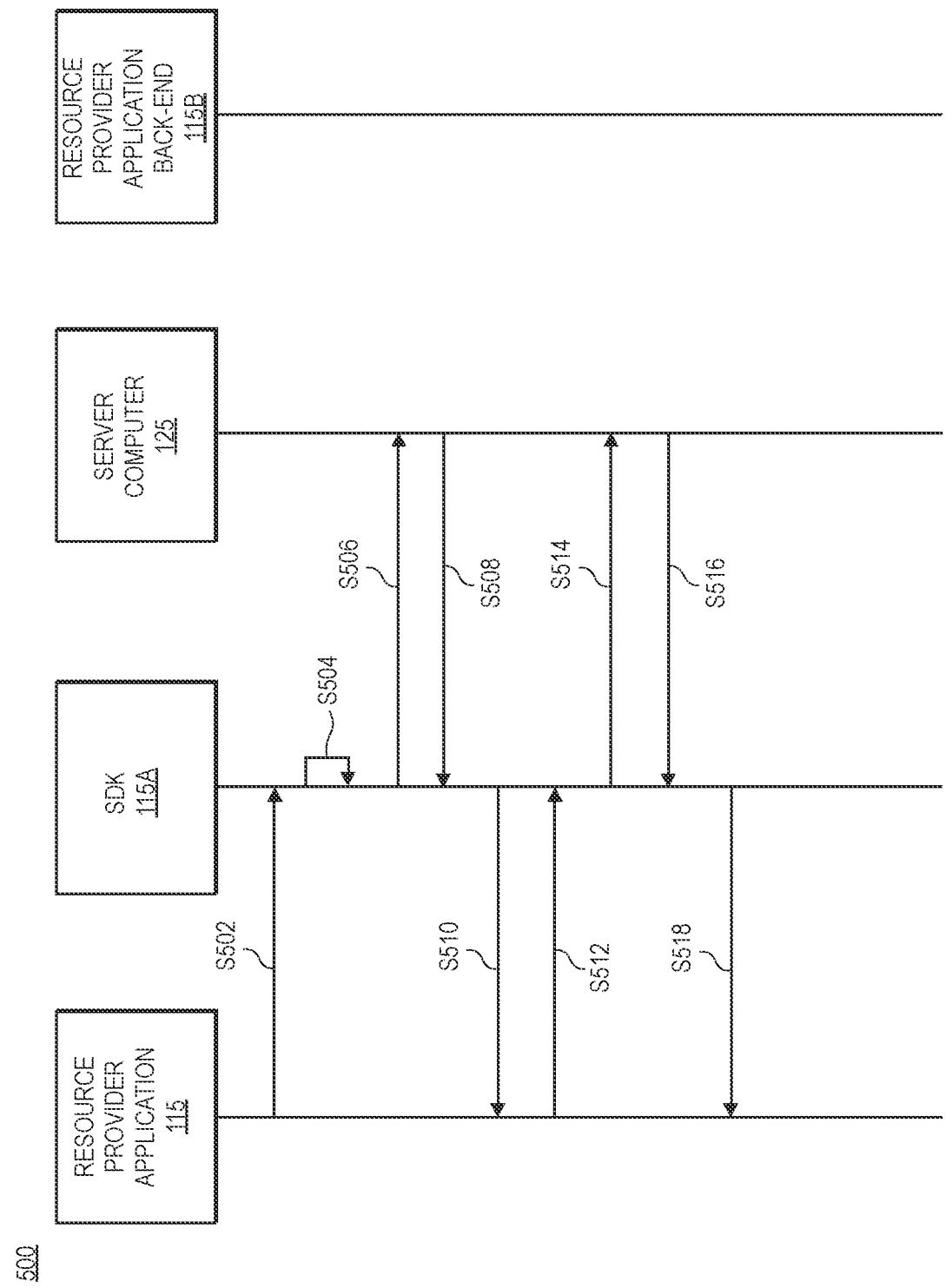
FIG. 5 shows a flow diagram illustrating a process according to various embodiments.

An exemplary process 500 for completing a card-present transaction with a user device 110 as an access or transaction terminal is illustrated in FIG. 5.

At step S502, the process 500 can be initiated, for example, via a resource provider application 115 stored on the user device 110. The resource provider application 115 can receive input from a user to cause the resource provider application 115 to commence a transaction between the user and the resource provider.

At step S504, the SDK 115A can read the NFC chip of a payment card (e.g., the credential storing device 130). This functionality can be enabled, for example, by the set of platform-specific scripts and can be sandboxed such that the resource provider computer 120, e.g., via the resource provider application backend 115B does not receive the account credentials read from the payment card.

At step S506, the account credentials (e.g., PAN, expiration date, and/or CVV code) can be transmitted to the server 125 via a communication channel between the user device 110 and the server computer 125, which is enabled by the set of platform-specific scripts of the SDK 115A. The account credentials can be transmitted as part of a transaction processing request message generated by one or more of the platform-specific scripts of the SDK 115A. In some embodiments, the transaction processing request message can include a token, certificate key, or other device identifier.

At step S508, the server computer 125 can validate the user device 110 based on the received token, certificate key, or other device identifier and transmit the results of the validation to the SDK 115A via the communication channel. For example, the server computer can query a database storing information associated with pre-registered devices to determine whether the user device 110 has been previously registered as an access terminal associated with the resource provider computer 120.

At step S510, the SDK 115A, can provide a status of the validation to the user, via the resource provider application 115. For example, if the device was not validated, the resource provider application 115 can display a message indicating the user device 110 is not registered as an access terminal and can prompt the user to begin a registration process.

If the device is validated, at step S512, the resource provider application can cause the SDK 115A to proceed with the initiated transaction. In some embodiments, upon validation of the user device 110, the user can prompt the resource provider application 115 to continue or can confirm the transaction.

At step S514, the SDK 115A can transmit the transaction information and the account credentials received from the credential storing device 130 to the server computer 125. The server computer 125 can obtain authorization for the transaction, for example, by communicating with an authorization entity which either authorizes or denies the transaction.

At step S516, the server computer 125 transmits, via the communication channel, the results of the authorization to the SDK 115A.

At step S518, the SDK 115A provides the results of the authorization to the user via the resource provider application 115. For example, the SDK 115A can generate a user interface displaying the results of the authorization and/or a receipt including transaction information.

As illustrated by process 500, there is no transfer of information to the resource provider application backend 115B outside of the SDK 115A. Accordingly, security is improved because the user's account credentials are not being stored or transmitted to external systems or environments beyond the server computer 125.

Figure 6:
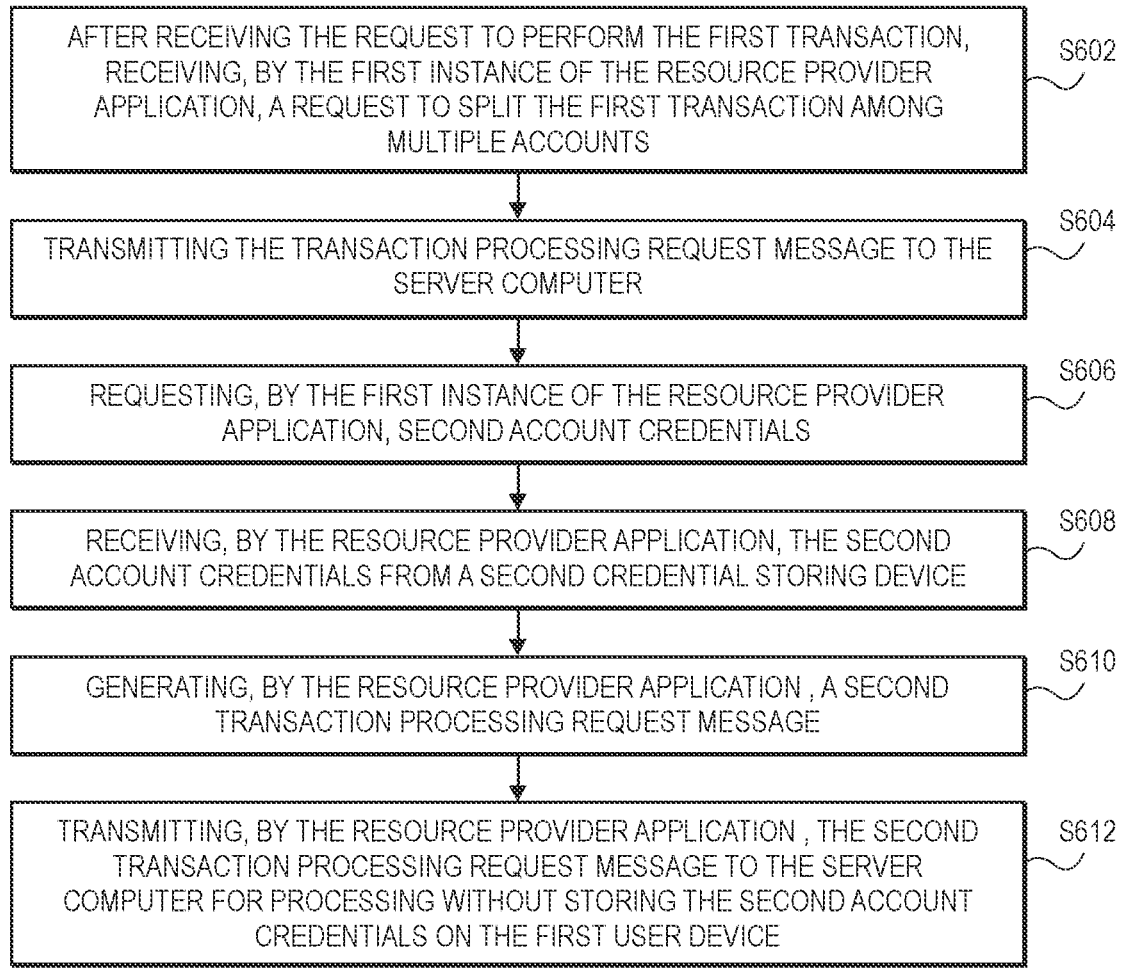
FIG. 6 shows a flow diagram illustrating a method according to various embodiments.

A method 600 according to embodiments of the present application can be described with respect to FIG. 6.

The method 600 can enable a user to complete a card-based transaction via a user device 110, while splitting the transaction across multiple payment cards (e.g., multiple credential storing devices). In some embodiments, the split transaction may be processed as a card-present transaction. In other embodiments, the split transaction may be processes as a card-not-present transaction even though the payment credentials are retrieved from two or more payment cards. The processing of the split transaction as a card-present or card-not-present transaction may be determined by the server computer. In other embodiments, the method 600 can enable a user to split a transaction into a combination of card-present and card-not-present transactions. The server computer may request additional authenticating information from the user when the split transaction or a portion thereof is to be processed as a card-not-present transcation.

At step S602, the method 600 includes after receiving the request to perform the first transaction, receiving, by the first instance of the resource provider application 115, a request to split the first transaction among multiple accounts. For example, step S602 can occur after step S414 of method 400. For example, a user may be completing a large purchase and wish to spread the purchase amount amongst several payment cards. In this case, the transaction information associated with the transaction can include a first portion of a total transaction amount, and the authorization decision associated with the transaction information includes a first authorization decision for the first portion of the total transaction amount.

In some embodiments, step S602 can occur simultaneously or directly after step S404 of the method 400. For example, when initiating the transaction, the user can indicate the desire to split the transaction across multiple payment cards. In some embodiments, the amount of the total transaction amount to be allocated to each payment card can be input by a user via an interface generated by the resource provider application 115. In other embodiments, the total balance can be evenly split amongst a number of payment cards indicated by the user.

At step S604, the resource provider application 115 can transmit the transaction processing request indicating the desire to split the transaction to the server computer 125.

At step S606, the method 600 includes requesting, by the first instance of the resource provider application, second account credentials. The second account credentials can be associated with a second payment card. As an example, the user can indicate that the transaction should be split between two payment cards. After receiving authorization of the first portion of the transaction amount (e.g., at step S414 of the method 400), the system 100 can proceed to request authorization of the remaining balance of the transaction using the second payment card.

At step S608, the method 600 includes receiving, by the first instance of the resource provider application 115 using the set of platform-specific scripts, the second account credentials from a second credential storing device via near field communication capability of the first user device 110. Thus, the resource provider application 115 can prompt the user via user device 110 to bring a second credential storing device within the near field communication capability of the user device 110.

At step S610, the method 600 includes generating, by the first instance of the resource provider application 115 using the set of platform-specific scripts, a second transaction processing request message including a second portion of a total transaction amount and the second account credentials.

At step S612, the method 600 includes transmitting, by the first instance of the resource provider application 115 using the set of platform-specific scripts, the second transaction processing request message to the server computer 125 for processing without storing the second account credentials on the first user device 110. Subsequently, the server computer 125 obtains a second authorization decision for the second portion of the total transaction amount using the second account credentials on behalf of the resource provider computer 120.

The steps of method 600 can be repeated such that the total amount of the purchase can be split any number of times between different payment methods or until the remaining balance of the transaction is paid. In some embodiments, for example, to facilitate refunds or lookups for a split transaction, the server computer 125 can assign a transaction ID to the total transaction, which is stored by the resource provider application 115. Each partial transaction can also be assigned the transaction ID such that the partial transactions can be mapped to the total transaction.

Figure 7:
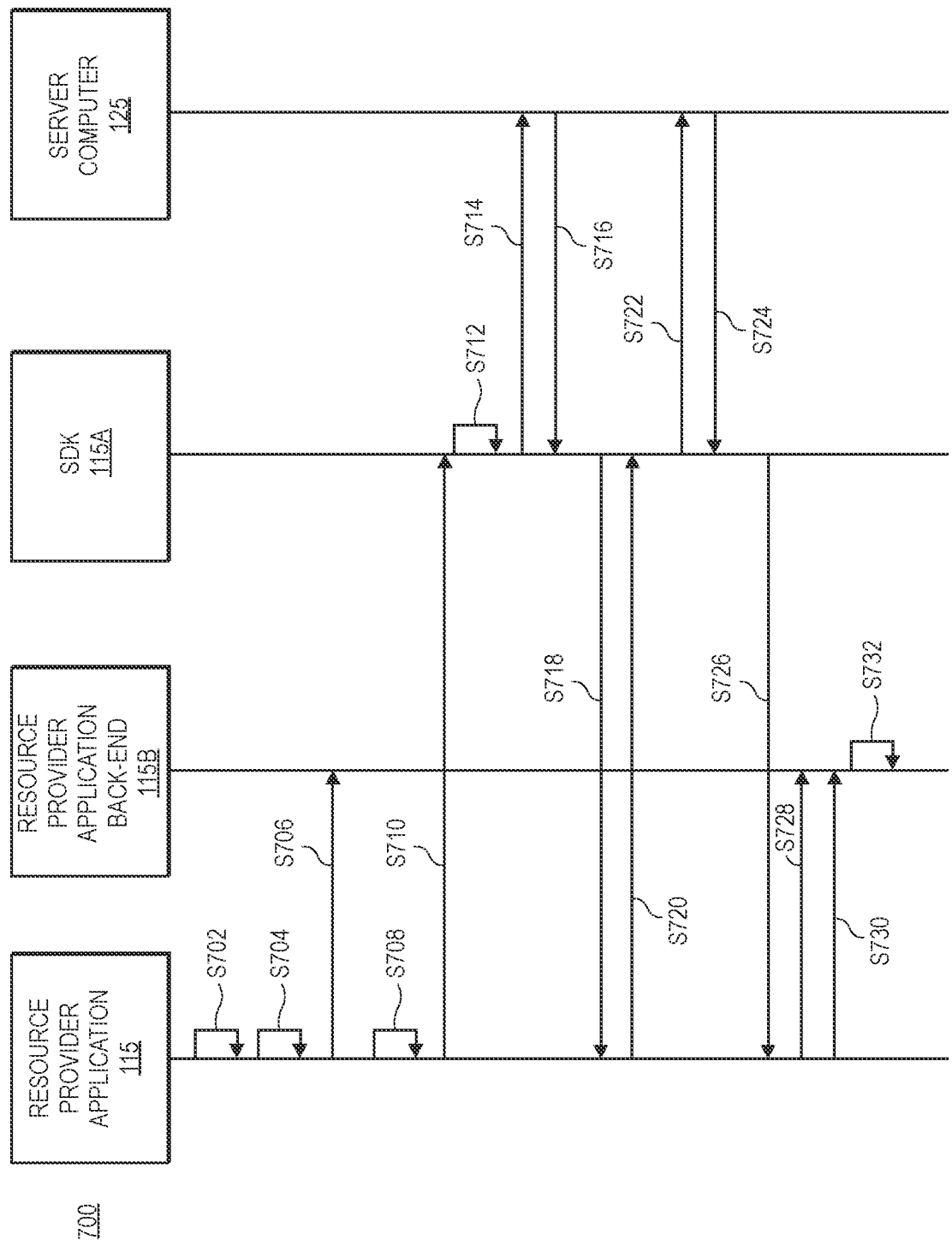
FIG. 7 shows a flow diagram illustrating a process according to various embodiments.

An exemplary process 700 for completing a split card-present transaction with a user device 110 as an access or transaction terminal is illustrated in FIG. 7.

At step S702, the process 700 can be initiated, for example, via a resource provider application 115 stored on the user device 110. The resource provider application 115 can receive input from a user to cause the resource provider application 115 to commence a transaction between the user and the resource provider. At this time the user can indicate the desire to split the transaction across multiple payment methods.

Figure 8A:
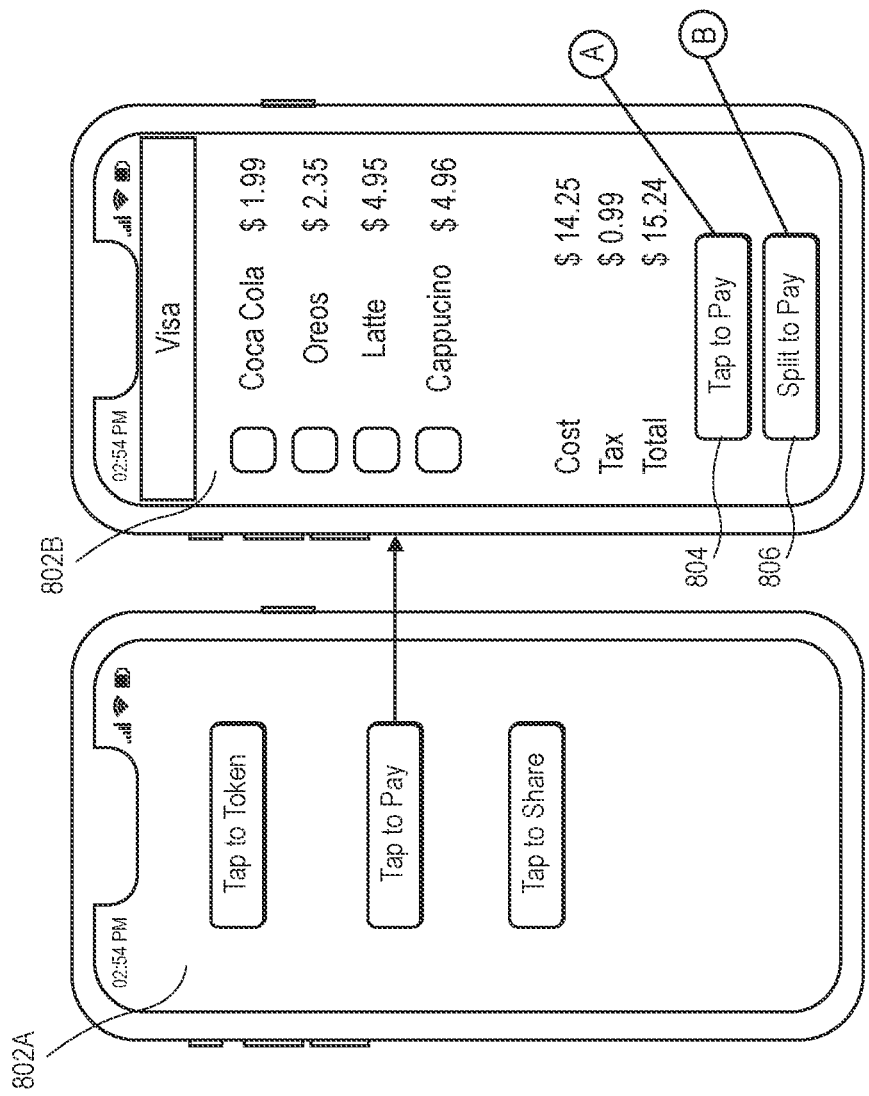
FIGS. 8A-8C show a series of exemplary interfaces according to various embodiments.
Figure 8B:
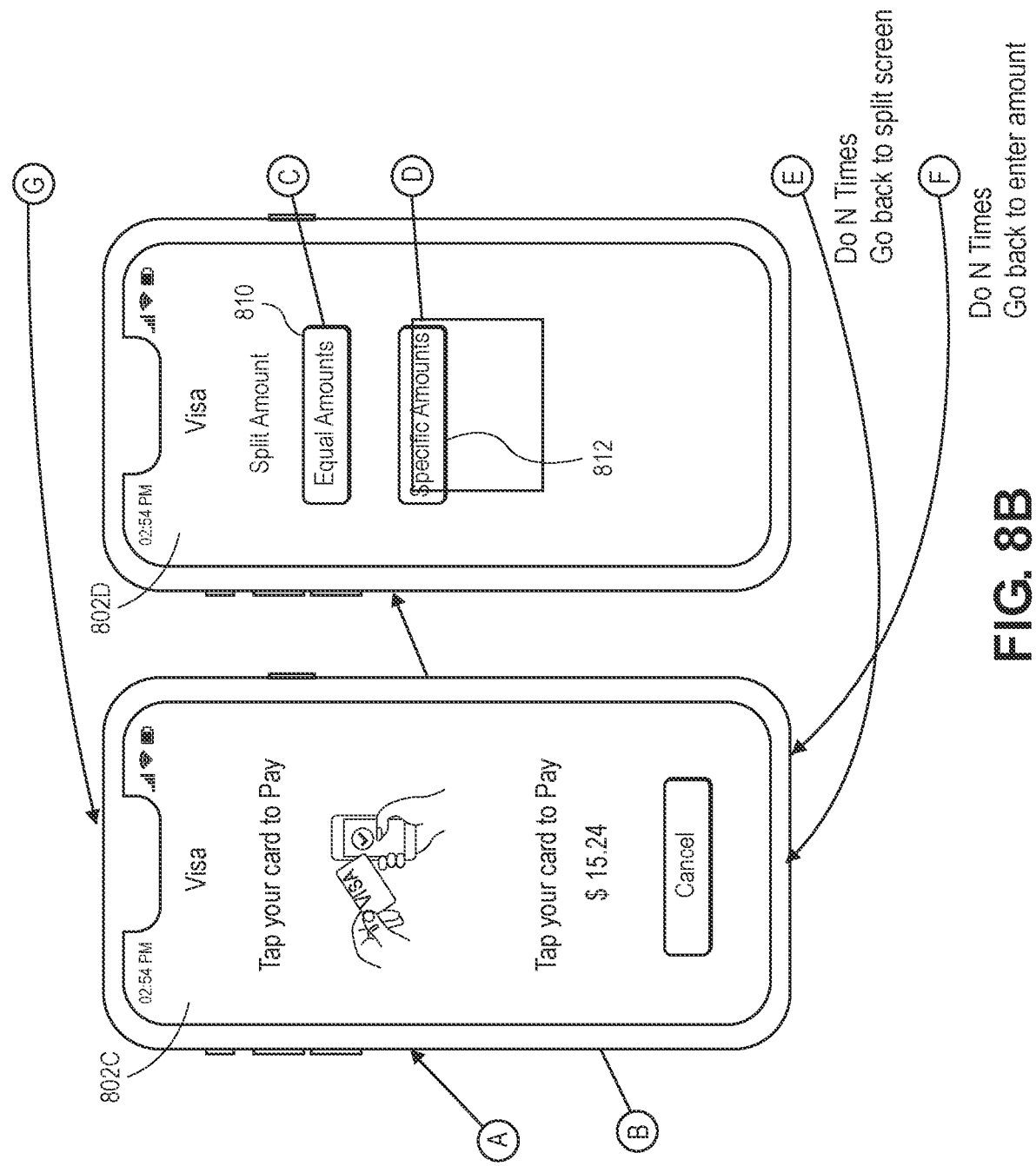
Figure 8C:
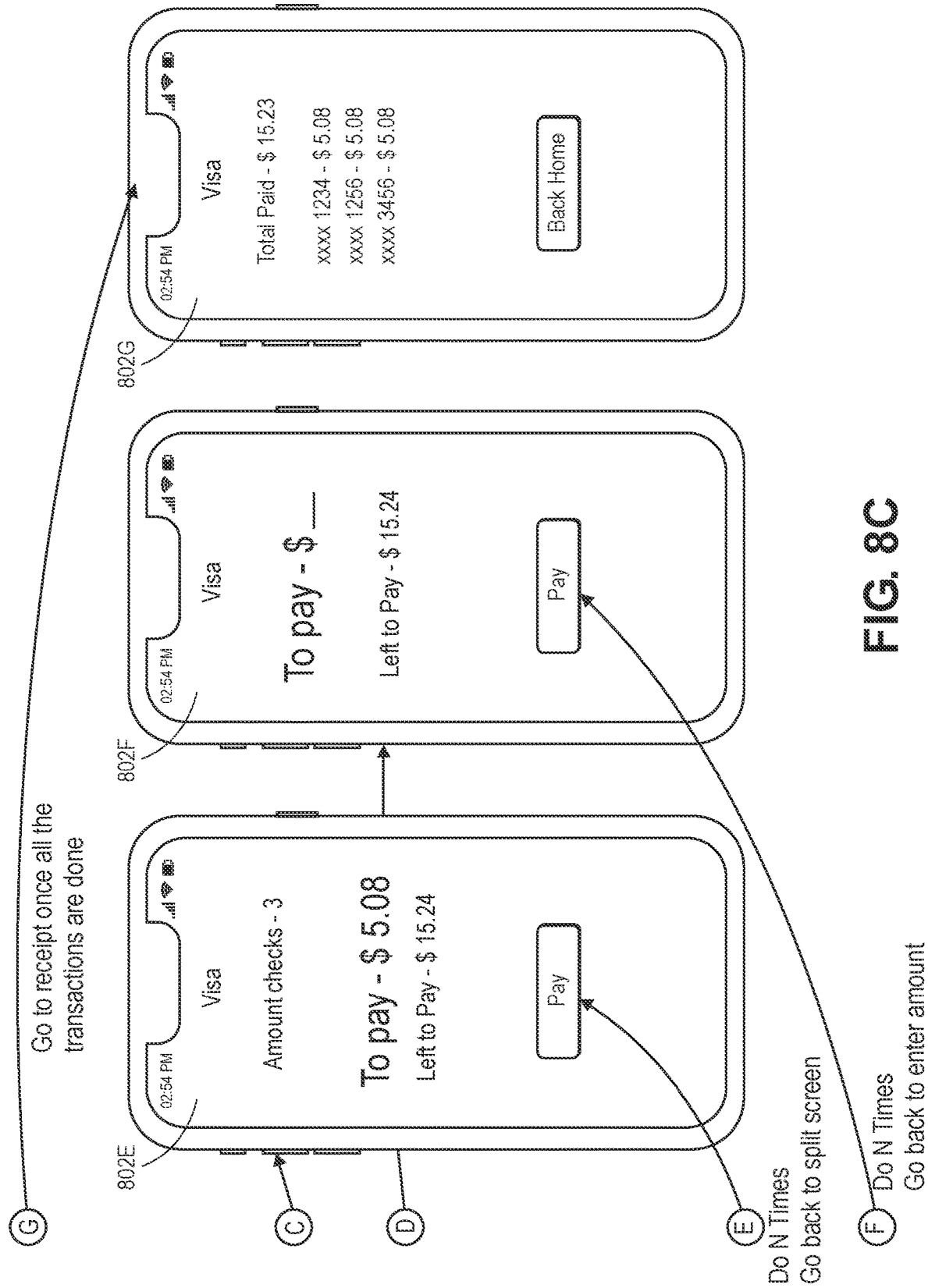

An exemplary interface 802 is shown in FIGS. 8A-8C. For example, the user can navigate the resource provider application 115 installed on the user device 110, which may display an interface 802A having a selectable "Tap to Pay" button 804 as shown in FIG. 8A. Other means of initiating the transaction via the interface 802A are possible. In response to a user selecting "Tap to Pay," the user device 110 can display an interface 802B that is configured to display transaction information as well as payment options, such as a "Tap to Pay" button 806 and a "Split to Pay" button 808.

If the user selects the "Tap to Pay" button 806, a process for completing the transaction with a single payment method can be initiated. For example, this can cause the process 500 as described with respect to FIG. 5 to kick off, thereby enabling the user device 110 storing the resource provider application 115 to act as an access terminal through which the user can complete the transaction with the resource provider using a single payment method. If the user selects the "Split to Pay" button 808, a process, e.g., process 700, for completing the transaction with multiple payment methods can be initiated.

Returning to FIG. 7, at step S704, the resource provider application 115 can create a split transaction. The split transaction can include transaction information indicative of a total transaction amount, number of payment methods, and amount of the transaction to be paid using each payment method.

At step S706, the resource provider application 115 registers the created transaction with the resource provider application backend 115B. The resource provider application backend 115B can, for example, track the completed sub-transactions, to ensure the total transaction amount is paid.

At step S708, the resource provider application 115 can receive, from the user, a first payment amount associated with a first payment method where the first payment amount is less than or equal to the total transaction amount.

Responsive to the first payment method being selected, at step S710 the resource provider application can initiate the transaction via the SDK 115A. As an example, this may cause the SDK 115A to establish an API or another communication channel with the server computer 125. As described previously, the SDK 115A may be included as part of the resource provider application 115 provisioned on the user device 110.

Once the first payment method is selected, the resource provider application 115 can display, via the user device 110, an interface 802C that may display a prompt to the user to "tap" the card to the user device 110 as shown in FIG. 8B. By "tapping" the payment card (e.g., the credential storing device) the user brings the payment card within range for a sensor of the user device 110 to receive account credentials from the payment card.

In some embodiments, prior to or after prompting the user to "tap" the payment card, the resource provider application 115 can display an interface 802D. The interface 802D can enable the user to select whether to split the transaction equally by selecting the "Equal Amounts" button 810, or to specify the amount of the transaction to allocate to each payment method by selecting the "Specify Amounts" button 812. In some examples, in response to electing to split the transaction equally, the user can be required to specify an amount of payment methods between which to split the transaction amount. For example, selecting to split the transaction equally can cause the resource provider application 115 to automatically determine an amount of the transaction amount to allocate to each payment method as shown in interface 802E of FIG. 8C. If the user selects to split the transaction, the resource provider application can display an interface 802F through which the user can specify the payment amount.

Returning to FIG. 7, at step S712, the SDK 115A can read the NFC chip of the first payment card (e.g., the credential storing device 130). This functionality can be enabled, for example, by the set of platform-specific scripts and can be sandboxed such that the resource provider computer 120, e.g., via the resource provider application backend 115B does not receive the account credentials read from the payment card.

At step S714, the account credentials associated with the first payment card (e.g., PAN, expiration date, and/or CVV code) can be transmitted to the server 125 via a communication channel between the user device 110 and the server computer 125, which is enabled by the set of platform-specific scripts of the SDK 115A. The account credentials associated with the first payment card can be transmitted as part of a transaction processing request message generated by one or more of the platform-specific scripts of the SDK 115A. In some embodiments, the transaction processing request message can include a token, certificate key, or other device identifier.

At step S716, the server computer 125 can validate the user device 110 based on the received token, certificate key, or other device identifier and transmit the results of the validation to the SDK 115A via the communication channel. For example, the server computer can query a database storing information associated with pre-registered devices to determine whether the user device 110 has been previously registered as an access terminal associated with the resource provider computer 120.

At step S718, the SDK 115A, can provide a status of the validation to the user, via the resource provider application 115. For example, if the device was not validated, the resource provider application 115 can display a message indicating the user device 110 is not registered as an access terminal and can prompt the user to begin a registration process.

If the device is validated, at step S720, the resource provider application 115 can cause the SDK 115A to proceed with the initiated transaction.

At step S722, the SDK 115A can transmit the transaction information (e.g., the first payment amount and the account credentials associated with the first payment card) to the server computer 125. The server computer 125 can obtain authorization for the transaction, for example, by communicating with an authorization entity which either authorizes or denies the transaction.

At step S724, the server computer 125 transmits, via the communication channel, the results of the authorization to the SDK 115A.

At step S726, the SDK 115A provides the results of the authorization to the user via the resource provider application 115. For example, the SDK 115A can generate a user interface displaying the results of the authorization and/or a receipt including transaction information.

At step S728, the resource provider application 115 can register the partial payment with the resource provider application backend 115B. In some embodiments, the resource provider application backend 115B may be tracking the total transaction and each sub-transaction under an assigned transaction ID, such that the amount of each sub-transaction can be deducted from the total transaction amount to determine a remaining transaction amount.

At step S730, the resource provider application 115 can verify the remaining balance of the transaction with the resource provider application backend 115B.

At step S732, the resource provider application backend 115B can check the remaining balance. The remaining balance can be determined based on the difference between the total transaction amount and the partial amounts of each sub-transaction. If there is remaining balance, steps S708 through S732 can be repeated until no balance is remaining. When no balance is remaining the resource provider application 115 can complete the transaction.

Once the transaction is complete, the resource provider application 115 can display an interface 802G to the user summarizing the total transaction broken down by sub-transaction. For example, the interface 802G can display the amount of the total transaction amount allocated to each payment method used to split the transaction.

In some embodiments, the server computer 125 and/or the resource provider application 115 can store a predetermined time limit for a pending transaction. For example, a predetermined time limit can be ten seconds, thirty seconds, one minute, two minutes, etc. The predetermined time limit can be implemented to improve security such that the communication channel between the user device 110 and the server computer 125 does not stay open indefinitely. In another embodiment, a predetermined time limit may require that each payment method (e.g., each credential storing device) transaction be completed within a certain period of time from the previous transaction. For example, if a user splits a transaction between two payment methods, the second payment method must be provided within a predetermined time from when the transaction with the first payment method is completed.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or integrated circuit assemblies memory such as a flash memory or a solid state storage, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive, and that embodiments are not to be limited to the specific arrangements and constructions shown and described, since various other modifications may occur to those with ordinary skill in the art.

As used herein, the use of "a," "an," or "the," is intended to mean "at least one," unless specifically indicated to the contrary.

What is claimed is:

1. A method comprising:
receiving, by a resource provider computer from a server computer, a set of platform-specific scripts to be incorporated into a resource provider application;
provisioning, by the resource provider computer, a first instance of the resource provider application on a first user device, wherein each instance of the resource provider application provisioned on a user device includes the set of platform-specific scripts;
receiving, by the first instance of the resource provider application on the first user device, a request to perform a first transaction;
requesting, by the first instance of the resource provider application, first account credentials for a user of the first user device;
receiving, by the first instance of the resource provider application using the set of platform-specific scripts, the first account credentials from a credential storing device via near field communication capability of the first user device;
generating, by the first instance of the resource provider application using the set of platform-specific scripts, a transaction processing request message including transaction information and the first account credentials; and
transmitting, by the first instance of the resource provider application using the set of platform-specific scripts, the transaction processing request message to the server computer for processing without storing the first account credentials on the first user device, wherein the server computer obtains an authorization decision associated with the transaction information of the first transaction using the first account credentials on behalf of the resource provider computer.

2. The method of claim 1, further comprising:
provisioning, by the resource provider computer, a second instance of the resource provider application on a second user device, wherein the second instance of the resource provider application provisioned on the second user device includes the set of platform-specific scripts;

receiving, by the second instance of the resource provider application on the second user device, a request to perform a second transaction;

requesting, by the second instance of the resource provider application, second account credentials for a user of the second user device;

receiving, by the second instance of the resource provider application using the set of platform-specific scripts, the second account credentials from the credential storing device via near field communication capability of the second user device;

generating, by the second instance of the resource provider application using the set of platform-specific scripts, a second transaction processing request message including transaction information associated with the second transaction and the second account credentials; and transmitting, by the second instance of the resource provider application using the set of platform-specific scripts, the second transaction processing request message to the server computer for processing without storing the second account credentials on the second user device, wherein the server computer obtains a second authorization decision for the second transaction using the second account credentials on behalf of the resource provider computer.

3. The method of claim 1, wherein the first instance of the resource provider application acquires the first account credentials for each new transaction performed using the first instance of the resource provider application.

4. The method of claim 1, wherein a unique identifier is assigned to the resource provider computer by the server computer, wherein each instance of the resource provider application provisioned on a user device includes the unique identifier.

5. The method of claim 4, wherein the transaction processing request message further includes the unique identifier of the resource provider computer, and a device identifier of the first user device, wherein the device identifier of the first user device is provided in a data field reserved for resource provider terminal identifier.

6. The method of claim 1, further comprising:

receiving, by the resource provider computer from the first user device, a request to provision the first instance of the resource provider application on the first user device, wherein the request includes a device identifier of the first user device; and registering, by the resource provider computer with the server computer, the first user device as a transaction terminal associated with the resource provider computer, wherein all user devices provisioned with an instance of the resource provider application are registered as transaction terminals associated with the resource provider computer.

7. The method of claim 1, wherein the first account credentials bypass the resource provider computer.

8. The method of claim 1, further comprising:

receiving, by the first instance of the resource provider application from the server computer, a certificate key upon provisioning the first instance of the resource provider application on the first user device, wherein the certificate key is specific to the first user device; and transmitting, by the first instance of the resource provider application to the server computer, the certificate key at pre-determined time intervals.

9. The method of claim 1, the method further comprising:

after receiving the request to perform the first transaction, receiving, by the first instance of the resource provider application, a request to split the first transaction among multiple accounts;

wherein the transaction information includes a first portion of a total transaction amount, and wherein the authorization decision associated with the transaction information includes a first authorization decision for the first portion of the total transaction amount, after transmitting the transaction processing request message to the server computer:

requesting, by the first instance of the resource provider application, second account credentials;

receiving, by the first instance of the resource provider application using the set of platform-specific scripts, the second account credentials from a second credential storing device via near field communication capability of the first user device;

generating, by the first instance of the resource provider application using the set of platform-specific scripts, a second transaction processing request message including a second portion of a total transaction amount and the second account credentials; and transmitting, by the first instance of the resource provider application using the set of platform-specific scripts, the second transaction processing request message to the server computer for processing without storing the second account credentials on the first user device, wherein the server computer obtains a second authorization decision for the second portion of the total transaction amount using the second account credentials on behalf of the resource provider computer.

10. A server computer comprising:

one or more processors; and a memory storing instructions that, when executed by the one or more processors, cause the one or more processors to perform steps comprising:

transmitting, to a resource provider computer, a set of platform-specific scripts to be incorporated into a resource provider application, wherein each instance of the resource provider application provisioned on a user device includes the set of platform-specific scripts;

registering each instance of the resource provider application provisioned on any user device as an access terminal associated with the resource provider computer;

receiving, directly from a first instance of the resource provider application on a first user device, a processing request message to perform a transaction, the processing request message including a device certificate previously assigned to the first user device by the server computer;

validating the first user device using the device certificate;

upon validating the first user device, receiving, directly from the first instance of the resource provider application on the first user device, transaction information and account credentials, wherein the account credentials bypass the resource provider computer;

obtaining an authorization decision in response to the processing request message using the account credentials on behalf of the resource provider computer;

transmitting the authorization decision to the first instance of the resource provider application on the first user device; and
transmitting the authorization decision to the resource provider computer.

11. The server computer of claim 10, wherein instructions for obtaining an authorization decision further comprises instructions for:
decrypting, in a cloud processing environment, the account credentials;
generating a transaction request message including an indication of presentment of a credential storing device during the transaction, wherein the account credentials are retrieved by the first instance of the resource provider application from the credential storing device via a near field communication capability of the first user device; and
transmitting the transaction request message to an authorizing entity, wherein the authorizing entity authorizes or declines the transaction based on at least the account credentials being retrieved by the first instance of the resource provider application from the credential storing device.

12. The server computer of claim 11, wherein the instructions that, when executed by the one or more processors, further cause the one or more processors to perform steps comprising:
pushing a user interface to the first instance of the resource provider application to be displayed on the first user device, wherein the user interface asks the credential storing device to be brought within the near field communication capability of the first user device.

13. The server computer of claim 10, wherein the instructions that, when executed by the one or more processors, further cause the one or more processors to perform steps comprising:
identifying the first instance of the resource provider application as one of a plurality of access terminals associated with the resource provider computer based on the device certificate.

14. The server computer of claim 10, wherein the processing request message further includes a unique identifier assigned to the resource provider computer by the server computer, and a device identifier of the first user device, wherein the device identifier of the first user device is provided in a data field reserved for resource provider terminal identifier.

15. The server computer of claim 10, wherein the instructions that, when executed by the one or more processors, further cause the one or more processors to perform steps comprising:
generating the device certificate specific to the first user device;
transmitting, to the first instance of the resource provider application, the device certificate; and
receiving, from the first instance of the resource provider application, the device certificate at pre-determined time intervals.

16. A method comprising:
transmitting, by a server computer to a resource provider computer, a set of platform-specific scripts to be incorporated into a resource provider application, wherein each instance of the resource provider application provisioned on a user device includes the set of platform-specific scripts;
registering, by the server computer, each instance of the resource provider application provisioned on any user device as an access terminal associated with the resource provider computer;
receiving, by the server computer directly from a first instance of the resource provider application on a first user device, a processing request message to perform a transaction, the processing request message including a device certificate previously assigned to the first user device by the server computer;
validating, by the server computer, the first user device using the device certificate;
upon validating the first user device, receiving, by the server computer directly from the first instance of the resource provider application on the first user device, a transaction information and account credentials, wherein the account credentials bypass the resource provider computer;
obtaining, by the server computer, an authorization decision in response to the processing request message using the account credentials on behalf of the resource provider computer;
transmitting, by the server computer, the authorization decision to the first instance of the resource provider application on the first user device; and
transmitting, by the server computer, the authorization decision to the resource provider computer.

17. The method of claim 16, wherein obtaining an authorization decision further comprises:
pushing, by the server computer, a user interface to the first instance of the resource provider application to be displayed on the first user device, wherein the user interface asks a credential storing device to be brought within a near field communication capability of the first user device, wherein the account credentials are retrieved by the first instance of the resource provider application from the credential storing device via a near field communication capability of the first user device;
decrypting, by the server computer in a cloud processing environment, the account credentials received from the credential storing device;
generating, by the server computer, a transaction request message including an indication of presentment of a credential storing device during the transaction, wherein the account credentials are retrieved by the first instance of the resource provider application from the credential storing device via a near field communication capability of the first user device; and
transmitting, by the server computer, the transaction request message to an authorizing entity, wherein the authorizing entity authorizes or declines the transaction based on at least the account credentials being retrieved by the first instance of the resource provider application from the credential storing device.

18. The method of claim 16, further comprising:
generating, by the server computer, the device certificate specific to the first user device;
transmitting, by the server computer to the first instance of the resource provider application, the device certificate;
receiving, by the server computer from the first instance of the resource provider application, the device certificate at pre-determined time intervals; and
identifying, by the server computer, the first instance of the resource provider application as one of access terminals associated with the resource provider computer based on the device certificate.

19. The method of claim 16, further comprising:
generating, by the server computer, a unique identifier for the resource provider computer, wherein the processing request message further includes the unique identifier assigned to the resource provider computer, and a device identifier of the first user device, wherein the device identifier of the first user device is provided in a data field reserved for resource provider terminal identifier.

20. The method of claim 16, further comprising:
managing, by the server computer, execution of the platform-specific scripts as part of the first instance of the resource provider application on the first user device, wherein managing includes maintaining a direct communication channel with the resource provider application on the first user device.

* * * * *